(12) United States Patent
Stopler et al.

(10) Patent No.: US 7,706,323 B2
(45) Date of Patent: Apr. 27, 2010

(54) WIRELESS COMMUNICATIONS IN A MULTI-SECTOR NETWORK

(75) Inventors: Dan Stopler, Holon (IL); Ze'ev Roth, Kadima (IL); Naftali Chayat, Kfar-Saba (IL)

(73) Assignee: Alvarion Ltd., Tel-Aviv (IT)

( * ) Notice: Subject to any disclaimer, the term of this patent is extended or adjusted under 35 U.S.C. 154(b) by 574 days.

(21) Appl. No.: 11/743,397

(22) Filed: May 2, 2007

(65) Prior Publication Data

US 2008/0273515 A1 Nov. 6, 2008

(51) Int. Cl.
*H04W 4/00* (2009.01)

(52) U.S. Cl. .................. 370/328; 370/334; 370/329; 370/336

(58) Field of Classification Search ............... 370/341, 370/343, 328–329, 334, 345, 336, 326, 482; 455/101, 562.1, 509, 450
See application file for complete search history.

(56) References Cited

U.S. PATENT DOCUMENTS

2002/0146060 A1 10/2002 Ertel et al.
2006/0028697 A1 2/2006 Sato et al.
2006/0109865 A1* 5/2006 Park et al. .................. 370/482
2007/0049218 A1* 3/2007 Gorokhov et al. ............ 455/102

FOREIGN PATENT DOCUMENTS

WO 2006138581 A 12/2006

* cited by examiner

*Primary Examiner*—Kamran Afshar
(74) *Attorney, Agent, or Firm*—Browdy and Neimark, PLLC

(57) ABSTRACT

In a wireless network employing Spatial Division Multiplexing Access ("SDMA") in at least one of its cells, a method is provided for dynamically allocating transmission resources to different subscriber devices. The method comprises the steps of: providing at least one base station comprising at least one antenna array; providing one or more sectors associated with that wireless communications network; dynamically dividing one or more of the sectors into a plurality of virtual sub-sectors, each allowing communications between the base station and at least one respective subscriber; from among the plurality of the virtual sub-sectors, selecting at least one pair of subscriber devices wherein each of the pair of subscriber devices is not interfered substantially by transmissions directed to the other subscriber of that pair; for each of the divided sectors, generating plurality of time frequency allocation maps; transmitting the generated maps to all virtual sub-sectors associated with the respective sector; and for each of the sectors, beamforming the transmissions to be conveyed to the subscriber devices' pairs, summing them and conveying the summed result towards the array antenna.

9 Claims, 5 Drawing Sheets

US 7,706,323 B2

WIRELESS COMMUNICATIONS IN A MULTI-SECTOR NETWORK

FIELD OF THE INVENTION

The present invention relates to method and apparatus adapted to improve the transmission of uplink and downlink signals and broadcast control signals in wireless communications systems, and more particularly to the improvement in Spatial Division Multiplexing Access ("SDMA") type of wireless networks.

BACKGROUND OF THE INVENTION

In a base station having an adaptive antenna array, when a subscriber device is due to exchange communications with its base station, a beam from the base station is directed towards that subscriber device (referred to herein as "beamforming"), and the received power for that subscriber device is respectively increased, roughly by 10*log 10 (Number of Antennas) relative a non beam formed case. Modern cellular wireless systems typical employ multi-user scheduling in order to improve the overall system throughput. This is done by scheduling transmissions to/from a given user when its channel power peaks, while scheduling-transmissions to/from other users when the channel power of that given user fades. The overall effect is that users are scheduled for transmissions under high signal to noise ratio conditions. Therefore, the additional power increase achievable by adaptive antenna system yields limited improvement in terms of throughput. Furthermore, one other problem characterizing this kind of a solution is the inherent delay associated with the transmissions, because as was explained above, transmissions are exchanged only when there is a peak in the channel power.

The solution that has been proposed to these problems was in the form of working in a Spatial Division Multiplexing Access ("SDMA") type of radio network, where a number of channels are transmitted simultaneously to a number of users, in order to reduce that delay and increase the overall (spectral) efficiency and throughput. Therefore in SDMA radio networks the same time-frequency resources are used multiple times thereby increasing the throughput and spectral efficiency of the network when compared to the case where SDMA is not employed.

Still, this method also suffers from several drawbacks. One of these drawbacks is related to the transmission of a control channel by the base station and its reception by the subscriber stations. All subscribers' devices must be provided with the appropriate information to allow each one of them to know who are the subscriber(s) due to receive transmissions in the next frame. For OFDM or OFDMA based technologies this information is referred to as a "map" and would typically contain time and frequency allocation assigned to the different subscribers. The information contained in the map is required for a number of reasons, for example a subscriber that tries to demodulate a time and frequency allocation beamformed to another user, will typically fail. Moreover, the map cannot be beamformed since all subscribers need to be able to read it. In other words, currently there is no way to beamform or spatial multiplex the maps to allow improving the spectral efficiency of the maps.

Another way to increase spectral efficiency is to increase the number of sectors per site, e.g. have 6 or more sectors per site. However the increase in this case relies on the fact that all sectors must be occupied. However as we add more sectors, some sectors are likely to have little or no traffic, so that in this case spectral efficiency gain would not be achieved in a practical setting. In addition this solution does not increase the peak rate of a user or the peak throughput of a sector, in contrast these two parameters are lower as interference from other sectors is increased.

The Spatial Division Multiplexing Access ("SDMA") technique referred to herein is a technique known in the art, and also used in advanced cellular standards e.g. IEEE Std 802.16e-2005 (WiMax).

SUMMARY OF THE INVENTION

It is an object of the present invention to provide a method and apparatus that allow achieving higher spectral efficiency without having an adverse effect upon the peak rate.

It is a further object of the present invention to enable operation of end user devices (e.g. CPEs, mobile stations, handsets, etc.) that are unaware or incapable of down/up link SDMA operation.

It is another object of the present invention to provide a method and device that are adapted to allow transmission of a plurality of maps while using system resources required for the transmission of a lower number of maps (e.g. one map), so as to reduce the high map overheads used in different standards such as the WiMax.

It is yet another object of the present invention to provide a method and device to provide the above advantages while adding a low cost hardware to the already existing hardware in the base station.

It is still another object of the present invention to allow deploying two or three sectors with the resources typically required for a single AAS sector, thus achieving higher spectral efficiency than an AAS sector, without significantly increasing sector cost.

It is yet another object of the present invention to provide means to carry out the SDMA technique while communicating with users that are unaware and/or incapable of SDMA operation of their radio network.

Other objects of the invention will become apparent as the description of the invention proceeds.

In accordance with a first aspect of the present invention, there is provided in a wireless communications network employing a Spatial Division Multiplexing Access ("SDMA") in at least one of the cells associated with that wireless communications network, a method for dynamically allocating transmission resources to different subscriber devices, where the dynamic allocation of resources is done for example on a frame by frame basis. The method comprises the steps of:

providing at least one base station comprising at least one antenna array;

providing one or more sectors associated with the wireless communications network;

dividing one or more of the one or more sectors into a plurality of virtual sub-sectors each generated to allow communications between the base station and at least one respective subscriber;

from among the plurality of the virtual sub-sectors, selecting at least one pair of subscriber devices, wherein each of the pair of subscriber devices is not interfered substantially by transmissions directed to the other subscriber of that pair;

for each of the one or more divided sectors, generating plurality of time frequency allocation maps;

transmitting the thus generated maps, to all virtual sub-sectors associated with a respective sector of the one or more divided sectors; and for each of the one or more sectors, beamforming (either digitally or by analog means) the transmissions to be conveyed to the subscriber devices' pairs, and then summing these signals and conveying the summed result towards the antenna array.

The term "not interfered substantially" as used in "each of the pair of subscriber devices is not substantially interfered by transmissions directed to the other subscriber of that pair", is used through the specification and claims to denote that if there are interferences at one of the pair's subscriber devices due to transmissions to the other subscriber device of that pair, such interferences will be at a relatively low level. The selection of the subscriber devices' pairs can be achieved for example by pairing devices wherein the result of a dot product between the antenna array signature of each of the subscriber devices in the pair would be lower than a pre-defined threshold, or by any other method known in the art per se.

By a preferred embodiment of the invention, the step of dividing one or more of the one or more sectors into a plurality of virtual sub-sectors, is carried out dynamically.

The maps referred to herein, for different virtual sub-sectors can preferably be orthogonal maps (between virtual sub-sectors), and operate in a mode of reuse-1 vs. other sectors, thereby reducing MAP interference between the virtual sub-sectors significantly.

As will be appreciated by those skilled in the art, although the embodiment described above provides a method for generating different maps in virtual sub-sectors associated with the same sector, the scheduling of the users, can preferably be done while taking into consideration the different relevant constraints associated with the various users belonging to a particular sector.

The term "scheduling of the users" as used herein and throughout the specification and claims, is used to denote the assignment of a time-frequency resource to the users. For example, for each sector having a time-frequency resource characterized by certain granularity, the information to be sent to the users is incorporated in accordance with that granularity.

The virtual sub-sectors according to an embodiment of the method provided by the present invention would change their azimuth coverage and in general their form, to best cover the currently active users of the sector.

According to a preferred embodiment of the invention, the multiple access method used is orthogonal frequency division multiple access (OFDMA). However, as will be appreciated by those skilled in the art, the present invention is also applicable to other multiplexing methods. For the sake of convenience, certain terms (e.g. tones) used herein refer to OFDMA technique. These terms should not be considered to limit the scope of the present invention so that other multiplexing methods that are carried out in accordance with the teaching of the present invention should be considered to be encompassed by the present invention, and the terms that are specific to OFDMA can be replaced by the corresponding terms as the case may be of the other multiplexing methods. For example, the term "tones" used in relation to OFDMA may be replaced with the term "codes" if CDMA is used instead of OFDMA.

According to another preferred embodiment of the invention time frequency allocations used for payload transmission, uses the same subsets of tones for all virtual sub-sectors belonging to a sector. By this embodiment, pairing of users which can be efficiently transmitted simultaneously and on the same frequency channels (SDMA-ed together) is facilitated. In contrast allocations in different sectors, will use different sets of tones for their time frequency allocation, allowing interference averaging of other sectors' transmissions. This embodiment may be considered as an attractive one as scheduling is possible within the same physical sector (and therefore same tone sets per allocations are preferred). In contrast, scheduling across different sectors or sites is not practical (therefore different tone sets would be preferred).

According to yet another preferred embodiment of the invention, each of the virtual sub-sectors included in a sector is a different MAC entity. In other words the subscriber receives maps from his virtual sub-sector, and performs all MAC operations with it. Thus when moving to another sub-sector, the subscriber would need to perform a handoff procedure.

Preferably, the method provided further comprises a step of receiving transmissions from the at least one pair of subscriber devices, to enable computing of beamforming and or nulling weights. This can be performed for example in either FDD (based on long term auto correlation matrix) or TDD duplexing method (based on current channel estimation), where the latter would typically produce better results. Alternately optimal SDMA weights may be computed. Yet another option which is known in the art and is more appropriate for FDD, is, to use close loop feedback from MSS.

By yet another preferred embodiment of the invention, if a subscriber device has a low signal to interference plus noise (SINP), it would not be paired with any other of the subscriber devices' associated with the corresponding sector.

In accordance with yet another preferred embodiment, the transmission antenna array is a member of the group consisting of: narrow array comprising 4 antennas; 2 pairs of closely spaced antennas separated by at least 10 wavelengths; or 2 triplets of close antennas separated by at least 8 wavelengths.

By still another preferred embodiment of the present invention, the predefined threshold in the step of selecting at least one pair of subscriber devices, is pre-determined in order to allow that the antenna array signature of each of the at least one pair of subscriber devices, is sufficiently different from the other. Consequently, such an arrangement allows keep reusing the same time-frequency resources, although these time-frequency resources may be varied dynamically in time and/or in reception quality and/or in location.

In accordance with still another preferred embodiment of the invention used for indoor coverage, the transmission is done by a set of single antennas located in different rooms (location) of a floor. Each antenna behaves as a different sector for the purpose of MAP transmission, however data transmission is by beamforming and nulling from all antennas together. For indoor coverage this would be a preferred way to deploy multiple "access points" per floor, which do not interfere with each other.

By yet another aspect of the present invention there is provided a communication device adapted to be used in an SDMA wireless system, and operative to divide one or more sectors comprised in the wireless communications network into a plurality of virtual sub-sectors, to select at least one pair of subscriber devices, both having array signatures that are substantially orthogonal to each other from among the plurality of the virtual sub-sectors, to generate and transmit frequency-time allocations maps based on the selection of the matched pair(s) to each of the sub-sectors, and to schedule the transmission destined to each of the subscriber devices associated therewith so as to maximize the SDMA gain.

DETAILED DESCRIPTION OF PREFERRED EMBODIMENTS

Figure 1:
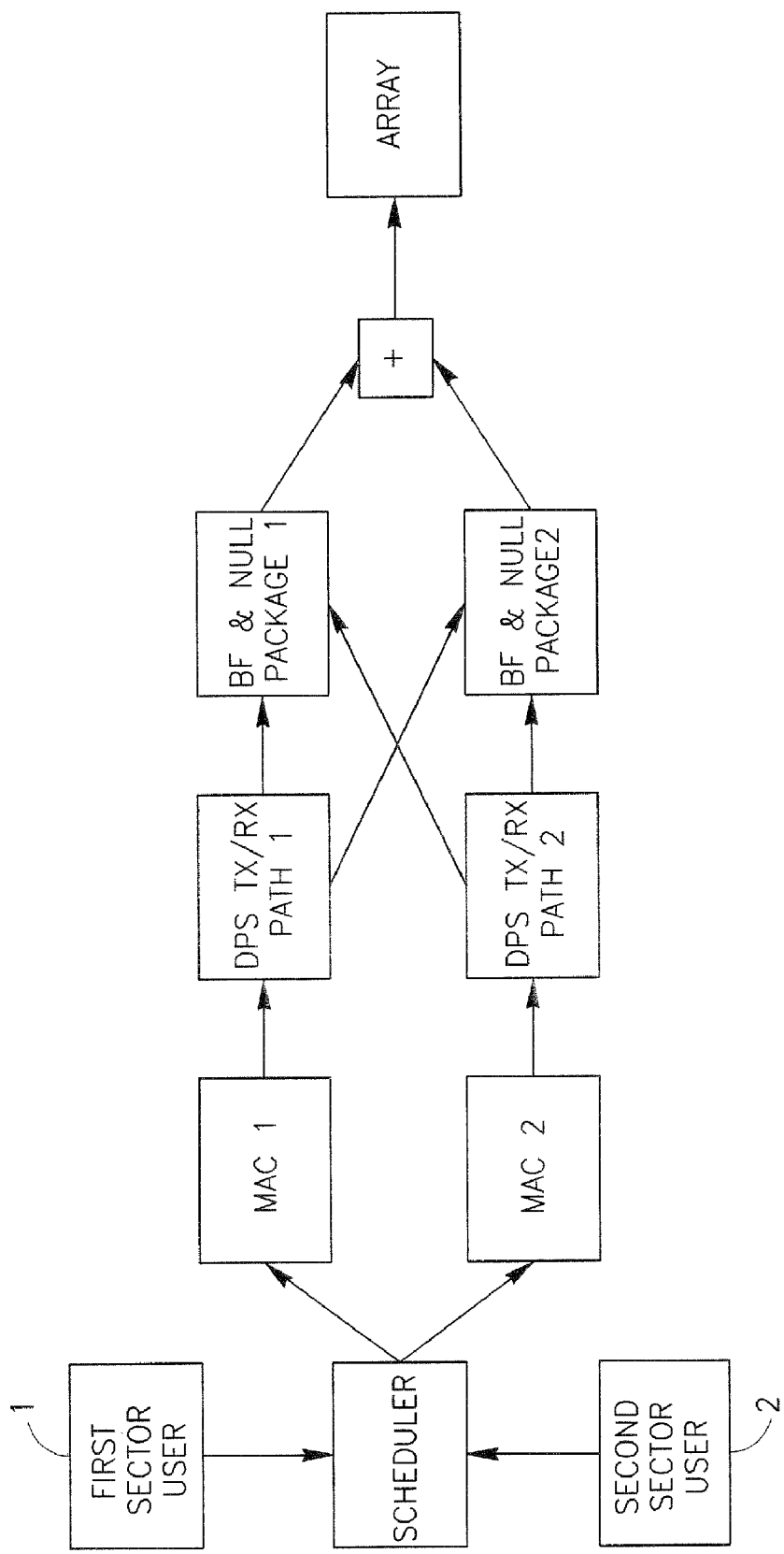
FIG. 1—presents a schematic illustration of a network utilizing the method of the present invention for improving the efficiency of SDMA based systems.

A better understanding of the present invention is obtained when the following non-limiting detailed description is considered in conjunction with the following drawings in which:

FIG. 1 describes an example of an embodiment of the present invention for using the resources of a single physical sector (i.e. a single antenna array) to generate two (Nsec=2) virtual sub-sectors. For WiMax typically the number of virtual sub-sectors is Nsec<=3.

Each path in FIG. 1 illustrates one virtual sub-sector. For example let us assume that user 1 is scheduled on virtual sub-sector 1, and is therefore handled by path 1, while user 2 is scheduled on virtual sub-sector 2 and is handled by path 2. The scheduler, which is shared by the two virtual sub-sectors, generates two users allocations maps (one for each virtual sub-sector), which are then processed by the MAC entities (MAC1 and MAC2). The scheduler needs to schedule transmissions to/from pairs of users (say user 1 and user 2) which have near orthogonal array signatures (and thus are efficiently SDMA'ed), at the same time and frequency allocations, but on different virtual sub-sectors. The MAC entities build the corresponding MAPs for each of the sub-sectors. These maps include in addition to the allocations made by the scheduler, also additional transmissions that need to be sent to maintain the connections. The MAPs are transmitted independently by each sub-sector, either in full loading (i.e. all bandwidth is used for each sub-sector, thus sub-sectors maps might interfere with each other) or in partial loading (part of bandwidth used for each sub-sector, allowing sub-sector maps to remain orthogonal), each MAP is beamformed to cover its virtual sub-sector. In one preferred embodiment (suitable for time division duplexing) the subscribers in all virtual sub-sectors need to be sounded. Sounding is a process by which a user transmits a known pattern, which is received by the BS and used to estimate the array signature of that user on the BS antenna array. The signature of user 1 is designated as signature 1, and that of user 2 as signature 2. For each pair of users scheduled at the same time and frequency allocations (that is SDMA'ed together), the beamforming and nulling routine is run once for each subscriber in the pair. For user 1, having path number 1, array signature 1 is used as the signature of the desired entity while that of array signature 2 as the interfering one, and the beamforming and nulling weights are then computed for user 1. Similarly (mutates mutandis), for user 2, having path number 2, array signature 2 is used as the signature of the desired entity while array signature 1 as the interfering one, and again beamforming and nulling weights are computed for user 2. The combined operation of the two beamforming and nulling generates a suboptimal SDMA beamformer (alternately one can use an optimal SDMA beamformer). The streams to SDMA pairs are beamformed (according to weights just computed), summed in the DSP, and transmitted to the single antenna array of the sector.

Over these NSec virtual sectors (a corresponding number), NSec, of MAC entities are used, so that a CPE views a single physical sector as a combination of NSec sub-sectors. However, as will be appreciated by those skilled in the art, although there are NSec number of MAC entities, there is only a single BS antenna array for that sector.

The scheduler (shared by the various MAC entities associated with a given sector) matches NSec users to maximize the SDMA gain. Preferably, a matching criterion is that the users' array signatures are as close to orthogonal as possible. A subscriber device having a poor SNR and/or poor reception conditions (e.g. under a pre-defined threshold) will preferably not be matched with others, so that it will enjoy the maximal diversity provided by the full degrees of freedom of the antenna array.

Different antenna arrays may possibly be used for implementing the present invention. For example, any one of the following arrays may be used: VVVV—Narrow antenna (e.g. half wavelength antenna spacing) array comprising 4 vertical antennas VV+VV-2 pairs of close (0.7 wavelength) vertical antennas separated by 10 wavelengths. VVV+VVV-2 triplets of close (0.7 wavelength) vertical antennas separated by 10 wavelengths.

Additionally, instead of using an antenna array to perform adaptive beam-forming and/or beam nulling, a fixed antenna array such as "Rotman Lens" may be used in conjunction with the virtual subsectors. Thereby, several "physical sectors" that are defined by the fixed antenna array can be considered as single sector, and the scheduling of all users belonging to that single sector are done jointly. This enables sharing and/or re-using the same time/frequency resources between these "physical sectors".

Figures 2A, 2B:
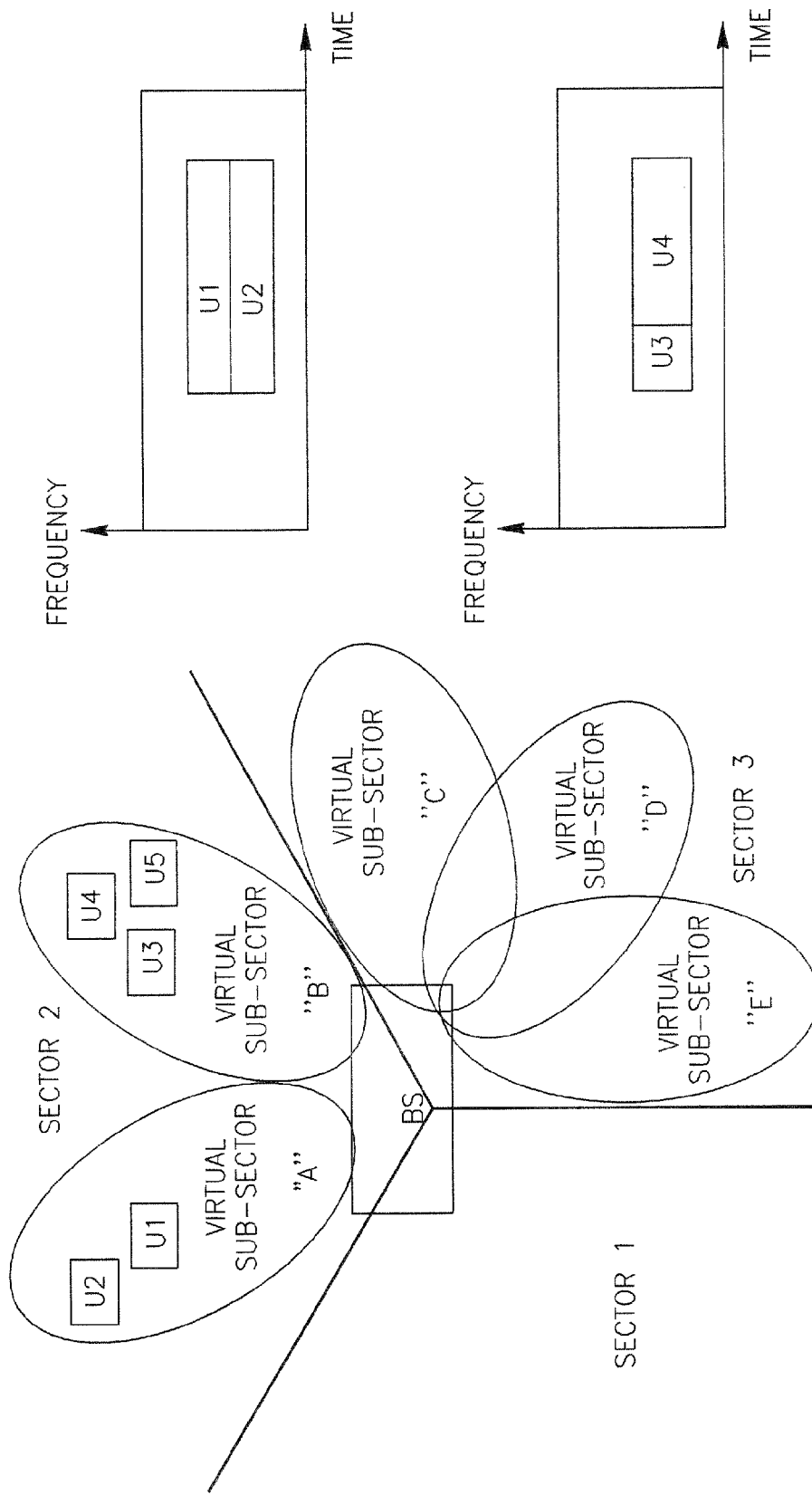
FIG. 2A—presents a schematic illustration of a system in which a sector has been divided into virtual sub-sectors and the users have been partitioned into groups that can share the same time-frequency resources while causing only minor interference to each other.
FIG. 2B—demonstrates the allocation of the same time-frequency resources to two groups of users (as shown in FIG. 2A), where each group is associated with a distinct virtual sub-sector.
Figure 3:
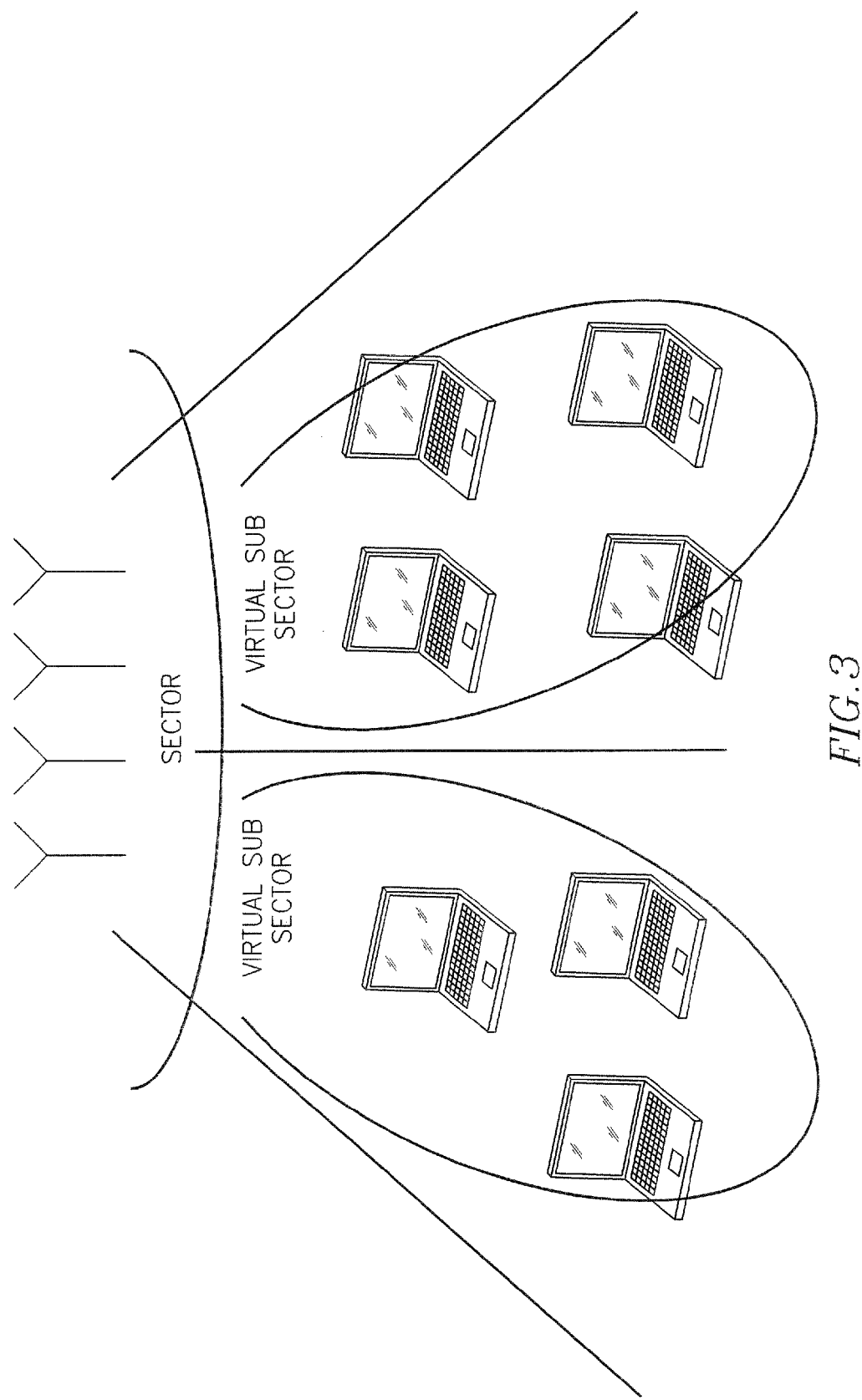
FIG. 3 presents a schematic illustration of a network in which a sector has been divided into virtual subsectors and the partitioning of the users into groups that can share the same time-frequency resources using a macro cell sector.

FIG. 2A presents a schematic illustration of a system in which a sector has been divided into virtual sub-sectors. The users, in accordance with this example, are partitioned into groups that can share the same time-frequency resources, and the major criterion used for such partitioning is that each use will cause no, or as little as possible, interference to the others;

FIG. 2B—demonstrates allocation of the same time-frequency resources to two groups of users (as shown in FIG. 2A), where each group is associated with a distinct virtual sub-sector;

FIG. 3 presents a schematic illustration of a network in which a sector is divided into virtual sub-sectors and the partitioning of the users into groups that can share the same time-frequency resources using a macro cell sector having a 120 degree width sector, that can be efficiently subdivided by sending the map over two narrow beams. Since the macro cell antennas are typically placed above rooftops, the beam patterns will determine the map coverage area, therefore division into sub-sectors is achievable. In this FIG., each sub-sector will be 60 degrees wide and would be covered by a 35 degrees wide beam. Data is sent in SDMA to achieve performance higher than possible with two fixed beams.

Figure 4:
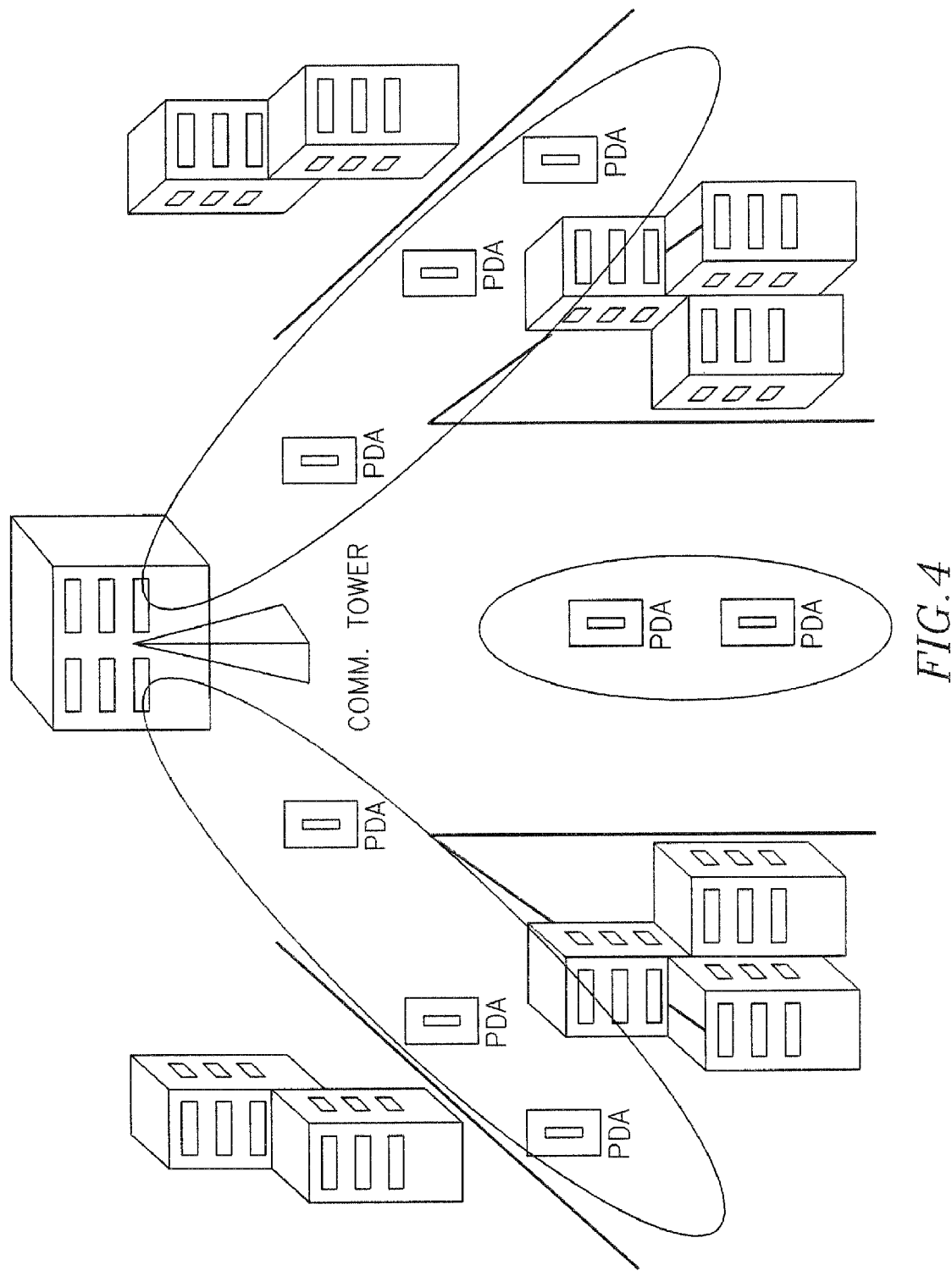
FIG. 4 illustrates an implementation in accordance with the present invention of sub-sectorization in a dense urban area.

FIG. 4 illustrates an example of employing sub-sectorization in accordance with the present invention, in a dense urban area. By this example the deployment of a micro cell in a junction is demonstrated. The deployment exemplified is in a way that it would cover several streets. Instead of having interferences between multiple fixed beams, the application of SDMA allows zeroing the mutual interference between CPE's, so that the same time-frequency resources can be utilized simultaneously thereby increasing the spectral efficiency of the network.

Figure 5:
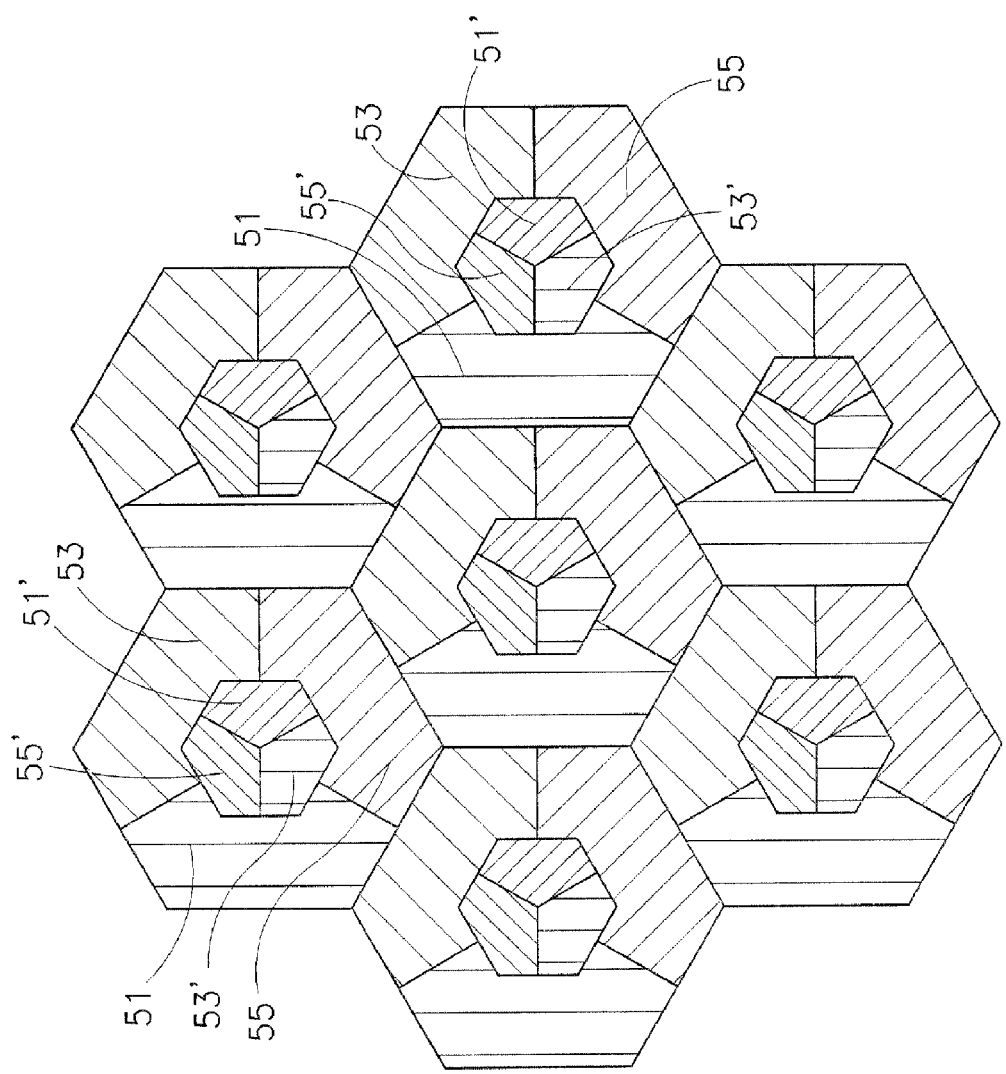
FIG. 5. presents a schematic illustration of Frequency Re-Use 3 scheme combined with virtual sub-sectorization.

FIG. 5. presents a schematic illustration of frequency Re-Use 3 scheme combined with virtual sub-sectorization. Three segments are used for frequency planning, 51, 53 and 55. The segments 51', 53', and 55' are low power versions of the 51, 53 and 55 segments, correspondingly. These low power segments are used for strong (e.g. nearby) users, which are good candidates for carrying out SDMA threat.

The antenna arrays belong to the high power (strong) sectors. Each low power sector is generated by two adjacent arrays beamforming to its direction. Maps are transmitted on outer sectors 51, 53 and 55 and in addition on inner 51', 53' and 55' sectors, so that we have 6 MAPs all together. In data zone, each high power sector may carry out up to third order SDMA, by carrying out SDMA process for two users of the low sectors (located at its left and right) and one strong sector user.

It is to be understood that the above description only includes some embodiments of the invention and serves for its illustration. Numerous other antenna arrays and/or ways of matching the subscriber devices to form the pairs may be devised by a person skilled in the art without departing from the scope of the invention, and are thus encompassed by the present invention.

The invention claimed is:

1. In a wireless network employing Spatial Division Multiplexing Access ("SDMA") in at least one of the cells associated with said wireless network, a method for dynamically allocating transmission resources to different subscriber devices, which method comprising the steps of:
   providing at least one base station comprising at least one antenna array;
   providing one or more sectors associated with said wireless communications network;
   dividing one or more of said one or more sectors into a plurality of virtual sub-sectors each generated to allow communications between the base station and at least one respective subscriber;
   from among said plurality of the virtual sub-sectors selecting at least one pair of subscriber devices, wherein each of the pair of subscriber devices is not interfered substantially by transmissions directed to the other subscriber of that pair;
   for each of said one or more divided sectors, generating plurality of time frequency allocation maps;
   transmitting said generated maps to all virtual sub-sectors associated with a respective sector of said one or more divided sectors; and
   for each of said one or more sectors, beamforming the transmissions to be conveyed to the subscriber devices' pairs, summing them and conveying the summed result towards said array antenna.

2. A method according to claim 1, wherein each of the virtual sub-sectors included in a sector is provided with a different MAC address than the remaining of the virtual sub-sectors included in said sector.

3. A method according to claim 1, wherein if a subscriber device has a low Signal to Interference+Noise Ratio (SINR) than a pre-determined threshold, it would not be paired with any other of the subscriber devices' associated with the corresponding sector.

4. A method according to claim 1, wherein said step of beamforming the transmissions to be conveyed to the subscriber devices' pairs, is based on a combination of the paired subscriber devices' beamforming and nulling.

5. A method according to claim 1, wherein some of said plurality of sectors are operative by transmitting high power transmissions while other sectors are operative by transmitting low power transmissions, and wherein each of the low power transmitting sectors is generated by two adjacent antenna arrays, each associated with a high power transmitting sector and beamforming at the direction of said low power transmitting sector.

6. A method according to claim 5, wherein the step of beamforming the transmissions to be conveyed to the subscriber devices' pairs from a high power transmitting sector comprises carrying out an SDMA process which involves transmissions associated with at least one user associated with said high power sector and two other users each associated with another sector of two low power sectors located adjacent to said high power sector.

7. A communication device for use in a wireless network employing SDMA in at least one of its cells, and operative to:
   divide one or more sectors comprised in said wireless communications network into a plurality of virtual sub-sectors;
   select from among said plurality of virtual sub-sectors at least one pair of subscriber devices, wherein each of the pair's subscriber devices is not interfered substantially by transmissions directed to the other subscriber of that pair;
   generate and forward time and frequency allocation maps based on the selection of said at least one pair to each of the virtual sub-sectors; and
   schedule transmissions destined to each of said subscriber devices so as to maximize the SDMA gain in sector throughput.

8. A method according to claim 1, wherein said at least one pair of subscriber devices is selected so that a dot product between the antenna array signature of each subscriber device of said at least one pair of subscriber devices is lower than a pre-defined threshold.

9. A method according to claim 8, wherein the predefined threshold is set to allow that the antenna array signature of each of said at least one pair of subscriber devices is sufficiently different from the other, in order to enable reusing the same time-frequency resources irrespective of dynamic variations in the time-frequency resources and/or in reception quality and/or in location.

* * * * *